US012804404B2

(12) United States Patent
Bencheikh et al.

(10) Patent No.: US 12,804,404 B2
(45) Date of Patent: Nov. 17, 2026

(54) WIRELESS ACCESS CONTROL VIA CONFIGURATION SETTINGS

(71) Applicant: Charter Communications Operating, LLC, St. Louis, MO (US)

(72) Inventors: Ahmed Bencheikh, Lorton, VA (US); Venkata R. Divvi, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 424 days.

(21) Appl. No.: 18/375,746

(22) Filed: Oct. 2, 2023

(65) Prior Publication Data

US 2025/0113200 A1 Apr. 3, 2025

(51) Int. Cl.

*H04W 12/73* (2021.01)
*H04W 12/61* (2021.01)
*H04W 28/10* (2009.01)

(52) U.S. Cl.

CPC ........... *H04W 12/73* (2021.01); *H04W 12/61* (2021.01); *H04W 28/10* (2013.01)

(58) Field of Classification Search

CPC ..... H04W 12/73; H04W 28/10; H04W 12/61; H04W 12/63; H04W 12/65
See application file for complete search history.

(56) References Cited

U.S. PATENT DOCUMENTS

2013/0225181 A1* 8/2013 Radulescu ............ H04W 72/56 455/442
2017/0105146 A1* 4/2017 Zeng ..................... H04W 64/00

* cited by examiner

*Primary Examiner* — Sulaiman Nooristany
(74) *Attorney, Agent, or Firm* — Armis IP Law, LLC

(57) ABSTRACT

A network environment includes a communication management resource. The communication management resource receives location information indicating a location of a newly detected or scheduled event in a network environment. The communication management resource determines one or more wireless access points in a vicinity of the location as specified by the location information. The determined one or more wireless access points are candidates to potentially to provide wireless services to one or more service officer devices. The communication management resource then controls flow of first data through the wireless access point in accordance wireless access point control information to support wireless communications associated with the event. For example, the communication management resource can be configured to adjust wireless bandwidth provided to other user devices such that the one or more service officer devices are given higher priority use and a number of devices are allowed to get the services.

23 Claims, 9 Drawing Sheets

WIRELESS ACCESS CONTROL VIA CONFIGURATION SETTINGS

BACKGROUND

Most of the existing wireless network service providers (i.e., network operators) provide wireless Internet access to a wide range of subscribers belonging to various classes of service subscriptions, which typically includes subscribers roaming between partner networks and traffic offloading from wide area wireless networks, using advanced wireless protocols. These roaming partnerships between so-called MSO's and other traditional wireless network operators provide their subscribers seamless roaming. The conventional wireless access points deployed in the field support a wide range of subscribers belonging to various service classes.

BRIEF DESCRIPTION OF EMBODIMENTS

This disclosure includes the observation that conventional wireless access points across different wireless network service providers are only able to differentiate the subscribers and provide priority access to certain users based on the class of service subscription and dynamic network conditions after authentication of a respective communication device for use of the wireless network. In cases where subscriber density is high or varying sporadically at a different times of the day/season, there is an impact to priority subscriber access, resulting in poor performance and poor user experience due to overload conditions on an access point.

Techniques herein provide an interface for service agencies and responder agencies which are partnered with service providers/MSOs, to: i) initiate on-demand live requests for priority service at a specific wireless access points/site/geographical area, ii) identify the subscriber's class in a security agency portfolio, and iii) prioritize the service agency personal traffic in that coverage area by applying various techniques the connection admission control & pre-emptive mechanisms for service requests from non-priority/regular users.

Most of the existing service provider Wi-Fi™ network operators provide wireless Internet access to a wide range of subscribers belonging to various classes of service subscriptions, which may include guests and roaming subscribers from other partners MSO's. Conventional wireless access points deployed in the field may support a wide range of subscribers belonging to various service classes, which lack the ability to differentiate the end users requesting the service at a given point in time and prioritize data flows.

Embodiments herein provide novel ways of providing improved wireless communications to one or more mobile communication devices in a network environment via unique control of wireless bandwidth provided in a network environment.

For example, a network environment includes a communication management resource. The communication management resource receives location information indicating a location of a newly detected or previously scheduled event in a network environment. The communication management resource determines one or more wireless access points in a vicinity of the location as specified by the location information and corresponding event. The determined one or more wireless access points are candidates to potentially to provide wireless services to one or more service officer devices managing the event. The communication management resource then controls flow of first data through the wireless access point in accordance wireless access point control information to support wireless communications associated with the event. For example, the communication management resource can be configured to adjust wireless bandwidth provided to other use devices in the network environment such that the one or more service officer devices are given higher priority use to manage the event.

In accordance with further examples as discussed herein, the controlled flow of first data through the wireless access point includes providing reduced bandwidth to a first communication device in communication with a remote network through the wireless access point in order to provide a second communication device increased bandwidth through the wireless access point to access the remote network. A user (such as a service officer) of the second communication device may be notified to manage the event via wireless communications transmitted from a wireless station (such as wireless access point, wireless base station, etc.) or other suitable entity disposed in the vicinity of the location. The wireless station (such as wireless access point, wireless base station, etc.) or other suitable entity may be disparately located with respect to the first wireless access point. In accordance with the wireless access point control information, the wireless access point conveys second data generated by the second communication device through the first wireless access point to the remote network. The second data (such as video images, audio information, etc.) is obtained via monitoring of the event.

In accordance with still further examples as discussed herein, the communication management resource can be configured to determine that the event is of a first type amongst multiple possible types output events. The communication management resource or other suitable entity can be configured to map the determined first type to the wireless access point control information.

Yet further, wireless communications associated with the wireless access point control in accordance with the wireless access point control information. The communication management resource can be configured to assign an expiration value to the wireless access point control information. The expiration value can be configured to indicate a duration of time in which the wireless access point control information is assigned to control the flow of first data through the wireless access point. After expiration of the wireless access point control information, the wireless access point reverts to controlling respective wireless communications in accordance with different wireless access point control information.

As further discussed herein, the communication management resource can be configured to assign a unique identifier value associated with a first communication device to the wireless access point control information. In such an instance, the wireless access point can be configured to control the flow of wireless communications associated with the first wireless communication device. For example, assume that the wireless access point receives a message communicated from the first communication device. The message includes a request for use of the first wireless access point to access the remote network. The wireless access point obtains a source identity value from the message. The source identity value indicates an identity of the first communication device communicating the message. In response to detecting that the source identity value in the received message matches the unique identifier value assigned to the wireless access point control information, the communication management resource provides the first communication device use of the first wireless access point to access the remote network.

In accordance with further examples as discussed herein, the communication management resource or other suitable entity can be configured to track use of the wireless access point in the vicinity of the location to provide wireless connectivity of multiple instances of user equipment to the remote network prior to controlling the flow of first data through the wireless access point in accordance with the wireless access point control information. Subsequent to the communication management hardware receiving the wireless access point control information, operation of the first wireless access point in the vicinity of the location is controlled in accordance with the wireless access point control information to provide wireless connectivity of the multiple instances of user equipment through the wireless access point to the remote network.

In accordance with yet further examples as discussed herein, the wireless access point receiving the wireless access point control information can be configured to receive a request from a first communication device for connectivity through the wireless access point to the remote network. In response to detecting that the first communication device has been authorized to establish the connectivity during a timeframe of implementing the wireless access point flow control information at the first wireless access point, the wireless access point provides the first communication device access through the first wireless access point to the remote network.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including computer readable hardware storage or medium on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless connectivity. The instructions, when executed by computer processor hardware, cause the computer processor hardware (such as one or more co-located or disparately processor devices) to: receive location information indicating a location of an event in a network environment; determine a wireless access point in a vicinity of the location as specified by the location information; and control flow of first data through the wireless access point in accordance wireless access point control information to support wireless communications associated with the event.

The ordering of the steps above has been added for clarity sake. Note that any of the processing steps as discussed herein can be performed in any suitable order.

Other examples of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless access and services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

Figure 1:
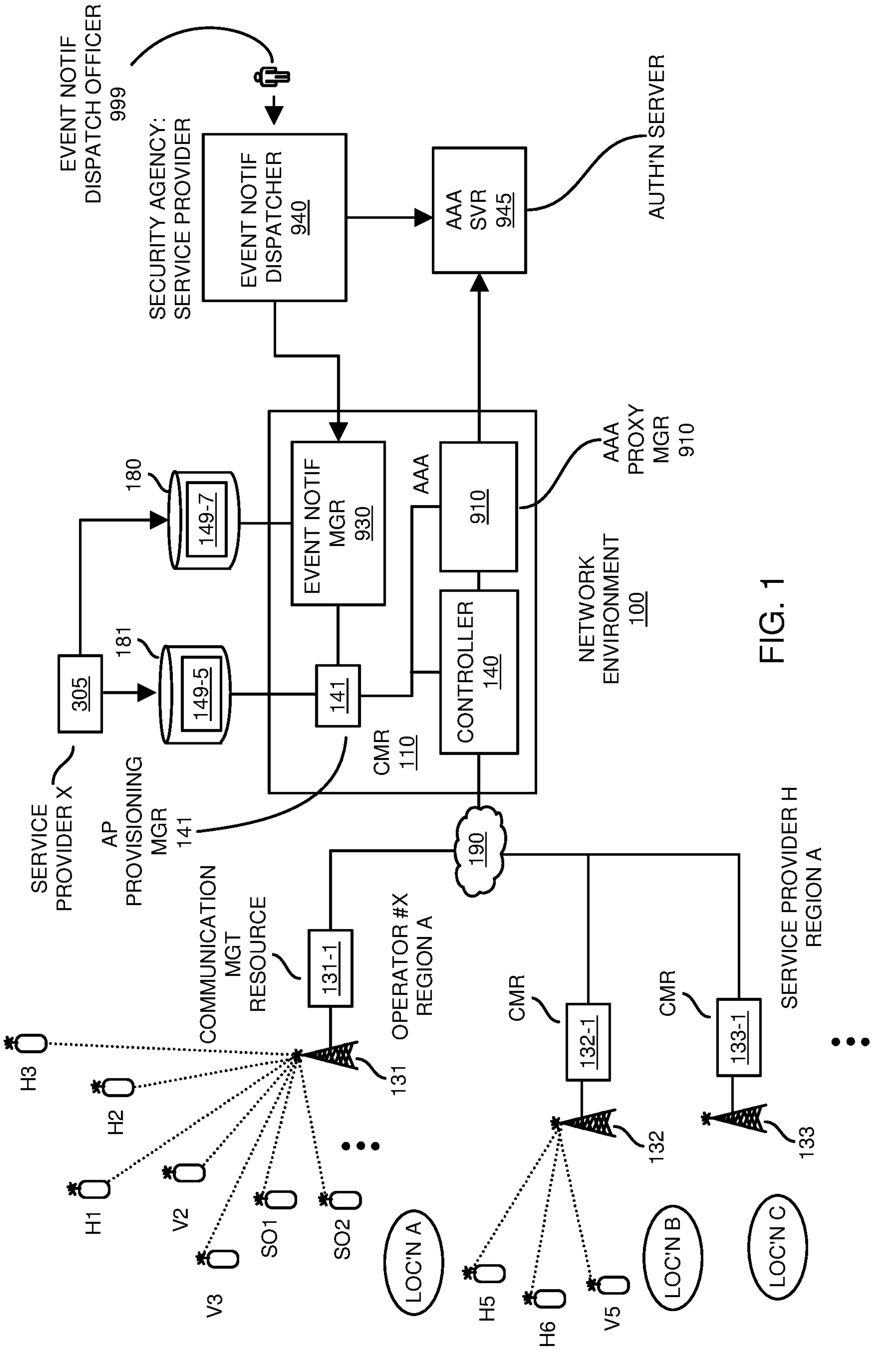
FIG. 1 is an example diagram illustrating a wireless network environment supporting priority wireless access control amongst visitor communication devices, home network communication devices, and security officers as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, a service provider network includes a communication management resource. The communication management resource receives location information indicating a location of a newly detected or scheduled event in a network environment. The communication management resource determines one or more wireless access points in a vicinity of the location as specified by the location information. The determined one or more wireless access points are candidates to potentially provide wireless services to one or more service officer devices. The communication management resource then controls the flow of first data through the wireless access point in accordance with wireless access point control information to support wireless communications associated with the event. For example, the communication management resource can be configured to adjust wireless bandwidth provided to other user communication devices such that the one or more service officer devices are given higher priority use to support the service officer and the communications associated with the event.

Examples herein include enhanced AP service logic to detect the service subscribers belonging to service agency for implementation of different levels of priority access to certain users based on their profile or class of service. The service logic (communication management resource) as discussed herein can be dynamic, and can be formed based on the on-demand request received from service agencies for a given AP(s)/Site/Area/Geo-Location.

There are several use cases for different levels of a class of service subscription for priority access, to name a few:

- Direct Internet access to service responders at a given site for the duration of the site classified as active, without needing complete authentication.
- Different levels of service prioritization to the service officer users (such as a service officers operating respective communication devices to provide services in the network environment) belonging to the service agency based on their service profiles and their roles at a given site in the network environment. As discussed herein, service officers provide one or more services in response to occurrence of different events in the network environment. The use of the wireless services by the security officers enables those officers to provide their assistance to persons associated with the events.
- Access control based on site classification and applied appropriate traffic treatment e.g. pre-empt some or all existing regular users at a given site and allow only service personnel to attend to services, or provide differentiated low bandwidth to regular users (non-service officer users), or lower the session duration to regular users and apply policies to restrict the number of sessions in a given period of time based on number of regular users attempting to get the service, etc.
- Priority access to service officer users to wireless network service provider Wi-Fi™ network during an event.

In region-A in FIG. 1, the potential for a higher number of home subscribers as well as roaming subscribers from one or many of the roaming partners is high, including the possibility of subscribers belonging to security agencies. For example, in a city like New York, there is the possibility of subscribers from a second wireless network service provider during Friday evening restaurant hours or weekend busy shopping hours. In traditional operation, a respective wireless network will allow all the subscribers from home as well as visiting subscribers from partner networks to use respective wireless access points. That will potentially lead to AP overload conditions, which in turn results in poor WLAN performance and a bad user experience for all subscribers served by that AP. It will create a bad user experience for home subscribers in their home network region.

Priority access can be provided to service (such as security) agency personal (or) responders to a service provider Wi-Fi network at the active site.

As an example, an Active Site in region-A identified by security agency first responder's agency sends a notification to the operator's event notification manager (ENM) system using their event notification dispatcher (END) system, with active site civic location details.

- The operator's ENM retrieves a list of AP's deployed in civic locations reported by service agencies and issues the automated commands to respective network elements serving the active site (AP, Group of AP's, Controllers, AAA, Gateways)
- Depending on the type of event notification & serving network conditions, network elements will implement appropriate actions, like below:
  - Pre-empt all connected devices, allowing only respective security/first respondent users.
  - Apply reduced bandwidth policies to non-priority users.
  - Apply session duration restrictions, the number of sessions per user for a given period during priority situations.
  - Only allow security-agency users for a period of time etc.
  - Apply different bandwidth policies, traffic polices (like only internet, Video streaming, Voice only, triple play service: Voice/Video/Internet etc.,) to security personnel attending the priority services based on their profiles, roles, and responsibilities.
  - Allow security users direct internet access, without performing authentication on the user's identity/Authentication server 1. The wireless network service provider or operator may perform the region-based connection admission control and client pre-emption or load balancing rules provisioning, in the AP policy provisioning manager based on the notification received from the security agency partner.

2. AP policy provisioning manager distributes the rules to region-specific controllers. These controllers can be configured to update the respective WLAN configurations with action rules, thresholds, and metrics to monitor for an action.

3. Visiting subscriber (belongs to a service agency partner) device attempts to discover and associate to the network upon processing the beacon frames received from surrounding access points. The client device includes its home network service provider identity in the discovery request.

4. The receiving wireless access point processes the received Association request and checks the CAC (Connection Admission Control) rules.

Additionally, the communication system as discussed herein can be configured to implement additional functions such as:

1. If the service officer communication device is allowed to associate with the network, then the communication management resource initiates the authentication flow toward the Authentication Server of the subscriber's home network (in this case, the Security agency's authentication server.

2. Depending on the type of event notification & service personnel attending the site (such as location A), appropriate action will be returned to servicing network in the form of policies, like below: a.) apply different bandwidth policies, and traffic policies (like only internet, Video streaming, Voice only, triple play service: Voice/Video/Internet etc.) to service personnel attending the event based on their profiles, roles, and responsibilities, b.) allow security users direct internet access, with or without performing authentication on the user's identity/Authentication server. Techniques as discussed herein also include enforcing high level security policies.

Now, more specifically, FIG. 1 is an example diagram illustrating a wireless network environment supporting priority wireless access control amongst visitor communication devices, home network communication devices, and service officer communication devices as discussed herein.

As shown, in this example, network environment 100 includes multiple wireless access points including wireless access point 131, wireless access point 132, wireless access point 133, etc. At the same or different times, each of the wireless access points provides one or more communication devices such as communication device H1, communication device H2, communication device V2, communication device SO1, communication device SO2, etc., wireless access to the network 190.

Note that any of the resources as discussed herein can be implemented via communication management hardware, software, or a combination of hardware and software. For example, each of the communication devices can be implemented as communication management hardware, communication management software, or a combination of communication management hardware and communication management software; the communication resource 110 can be implemented as communication management hardware, communication management software, or a combination of communication management hardware and communication management software; each wireless access point can be implemented as wireless access point hardware, wireless access point software, or a combination of wireless access point hardware and wireless access point software; controller 140 can be implemented as controller hardware, controller software, or a combination of controller hardware and controller software; access point provisioning manager 141 can be implemented as access point provisioning manager hardware, access point provisioning manager software, or a combination of access point provisioning manager hardware and access point provisioning manager software; entity 305 (such as functions associated with the wireless network service provider X) generating the respective access configuration information 149-5 and/or map information 149-7 can be implemented as configuration setting hardware, configuration settings generator software, or a combination of configuration settings generator hardware and configuration setting generator software; event notification manager 930 can be implemented as event notification manager hardware, event notification manager software, or a combination of event notification manager hardware and event notification software; proxy manager 910 can be configured as proxy manager hardware, proxy manager software, or a combination of proxy manager hardware or proxy manager software; event dispatcher 940 (such as a communication management resource) can be implemented as event dispatcher hardware, event dispatcher software, or a combination of event dispatcher hardware and event dispatcher software; authentication server 945 (such as a communication management resource) can be configured as authentication server hardware, authentication server software, or combination of authentication server hardware and authentication server software and so on.

Assume that the wireless access point 131 and corresponding communication management resource 131-1 currently provide one or more communication devices such as communication device H1 (home or non-visiting subscriber associated with the wireless network service provider X), communication device H2 (subscriber of service provider H), . . . , visitor communication device the V2 (subscriber of wireless network service provider Y), visitor communication device the V3 (subscriber of wireless network service provider X), etc., wireless access to the network 190.

As discussed herein, note that the wireless network service provider X may provide wireless services to visitor communication device that subscribe to other service providers such as wireless network service provider Y, wireless network service provider Z, etc.

As further shown, the wireless access point 132 and corresponding communication management resource 132-1 currently provide one or more communication devices such as communication device H5 (subscriber of service provider X), communication device H6 (subscriber of service provider X), . . . , visitor communication device V5 (subscriber of service provider Y), etc., wireless access to the network 190.

Wireless access point 131, wireless access point 132, and wireless access point 133 each reside in region A supported by the service provider X (a.k.a., home service provider). Communication devices in region A can potentially connect to wireless access points 131, 132, and 133, to access the network 190 depending on load conditions.

As further shown, the network environment 100 further includes communication management resource 110. Communication management resource 110 includes controller 140, access point provisioning manager 141, event notification manager 930, proxy manager 910, etc.

In general, service provider X (via entity 305) produces corresponding access configuration settings 149-5 (wireless access control settings) indicating wireless access rules of providing different communication devices access to the network 190 through respective wireless access points. As further discussed herein, the access configuration settings 149-5 associated with the service provider X can be configured to indicate how to partition usage of available wireless bandwidth amongst home communication devices (subscribers of the wireless network service provider X) and visitor communication devices operated by wireless network service provider Y, etc.

As its name suggests, the access point provisioning manager 141 provisions use of the different wireless access points and corresponding wireless bandwidth to provide wireless access services to the different communication devices based on the access configuration settings 149-5. The controller 140 enforces the access configuration settings 149-5 as further discussed herein.

Note that the implementation of the access configuration settings 149-5 can be configured to provide load-balancing amongst the different wireless access points prior to authentication of the respective communication devices requesting access.

AP based Solution

One solution described in this section is for one of the use cases to provide priority access to home network subscribers over visiting subscribers from roaming partners during non-event conditions.

Operator-X (i.e., service provider X or home network service provider) deploys wireless access points (such as Wi-Fi™ access points) in two or more different regions A and B providing Wi-Fi™ or other type of wireless connectivity to the wide range of home network subscribers (subscribers of service provider X) as well as allowing roaming or visitor subscribers (subscribers of service provider Y, etc.). Note that the wireless access points can be configured to support any suitable wireless communication protocol.

In one example, each of the wireless access points 131, 132, 133, and corresponding communication devices H1, H2, H3, V2, V3, SO1, SO2, etc., support a listen before talk function to access and communicate with each other. For example, the communication device H1 may be allocated use of wireless bandwidth to communicate with the wireless access point 131.

In order to communicate data from the communication device H1 over a respective wireless communication link to the wireless access point 131, the communication device H1 must first monitor a respective wireless channel supporting communications between the communication device H1 and the wireless access point 131. The communication device H1 waits until a clear channel condition occurs before communicating to the wireless access point 131. For example, if the wireless energy level over the wireless channel as detected by the communication device H1 is below a wireless energy threshold level at a particular time, the communication device H1 acquires the wireless channel by communicating data from the communication device H1 to the wireless access point 131. The communication device H1 does not use the wireless channel if the wireless energy in the channel is above the threshold level.

Conversely, in the downstream direction, the wireless access point 131 can be configured to monitor use of the wireless channel. In order to communicate data from the wireless access point 131 to the communication device H1 over a respective wireless communication link, the wireless access point 131 must first monitor a respective wireless channel supporting communications between the wireless access point 131 in the communication device H1. The wireless access point 131 waits until a clear channel condition occurs before communicating to the communication device H1. For example, when the wireless energy level of wireless communications over the wireless channel as detected by the wireless access point 131 is below a wireless energy threshold level, the wireless access point 131 acquires the wireless channel by communicating data from the wireless access point 131 to the communication device H1. The wireless access point 131 does not use the wireless channel if the wireless energy in the channel is above the threshold level.

In order to communicate data from the communication device SO1 over a respective wireless communication link to the wireless access point 131, the service officer communication device SO1 must first monitor a respective wireless channel supporting communications between the service officer communication device SO1 and the wireless access point 131. The communication device SO1 waits until a clear channel condition occurs before communicating to the wireless access point 131. For example, if the wireless energy level over the wireless channel as detected by the communication device SO1 is below a wireless energy threshold level at a particular time, the communication device SO1 acquires the wireless channel by communicating data from the communication device SO1 to the wireless access point 131. The communication device SO1 does not use the wireless channel if the wireless energy in the channel is above the threshold level.

Conversely, in the downstream direction, the wireless access point 131 can be configured to monitor use of the wireless channel. In order to communicate data from the wireless access point 131 to the communication device SO1 over a respective wireless communication link, the wireless access point 131 must first monitor a respective wireless channel supporting communications between the wireless access point 131 in the communication device SO1. The wireless access point 131 waits until a clear channel condition occurs before communicating to the communication device SO1. For example, when the wireless energy level of wireless communications over the wireless channel as detected by the wireless access point 131 is below a wireless energy threshold level, the wireless access point 131 acquires the wireless channel by communicating data from the wireless access point 131 to the communication device SO1. The wireless access point 131 does not use the wireless channel if the wireless energy in the channel is above the threshold level.

In region A, the potential for roaming (i.e., visitor) subscribers from one of the roaming partners is high. For example, in a city like New York, there is a possibility of subscribers (such as operating respective visitor communication devices) from service provider Y attempting to use wireless services provided by the wireless network service provider X during Friday evening restaurant hours or weekend busy shopping hours. In accordance with traditional service provider X operation, the wireless access point 131 will allow all the subscribers from home as well as visiting subscribers to access the network 190. This may potentially lead to access point overload conditions if too many communication devices are allowed wireless access through a respective wireless access point. The overload conditions result in poor wireless performance and a bad user experience for all subscribers served by that wireless access point. Accordingly, the overload will create a bad user experience for home subscribers in their home network region.

As further described herein, for region A, the service provider X may wish to restrict roaming subscribers (visitor communication devices) belonging to a roaming partner network (such as wireless network service provider Y) on any given wireless access point in region A limited to N (such as limit of 5). Similarly, for region B, assume that the service provider X wants to restrict roaming subscribers belonging to a roaming partner (service provider Y) on any given wireless access point in region B no more than 3 users (or some other value). For region B, the service provider X may wish to restrict roaming subscribers belonging to a roaming partner (service provider Z) on any given wireless access point in region B no more than 2 users (or some other value).

In such an instance, the service provider X can be configured to produce the corresponding access configuration settings 149-5 to indicate the limits for home communication devices and visitor communication devices and corresponding users. In addition to generating the corresponding access configuration settings 149-5, the service provider X or other suitable entity can be configured to generate the corresponding access configuration information 149-5.

Figure 2:
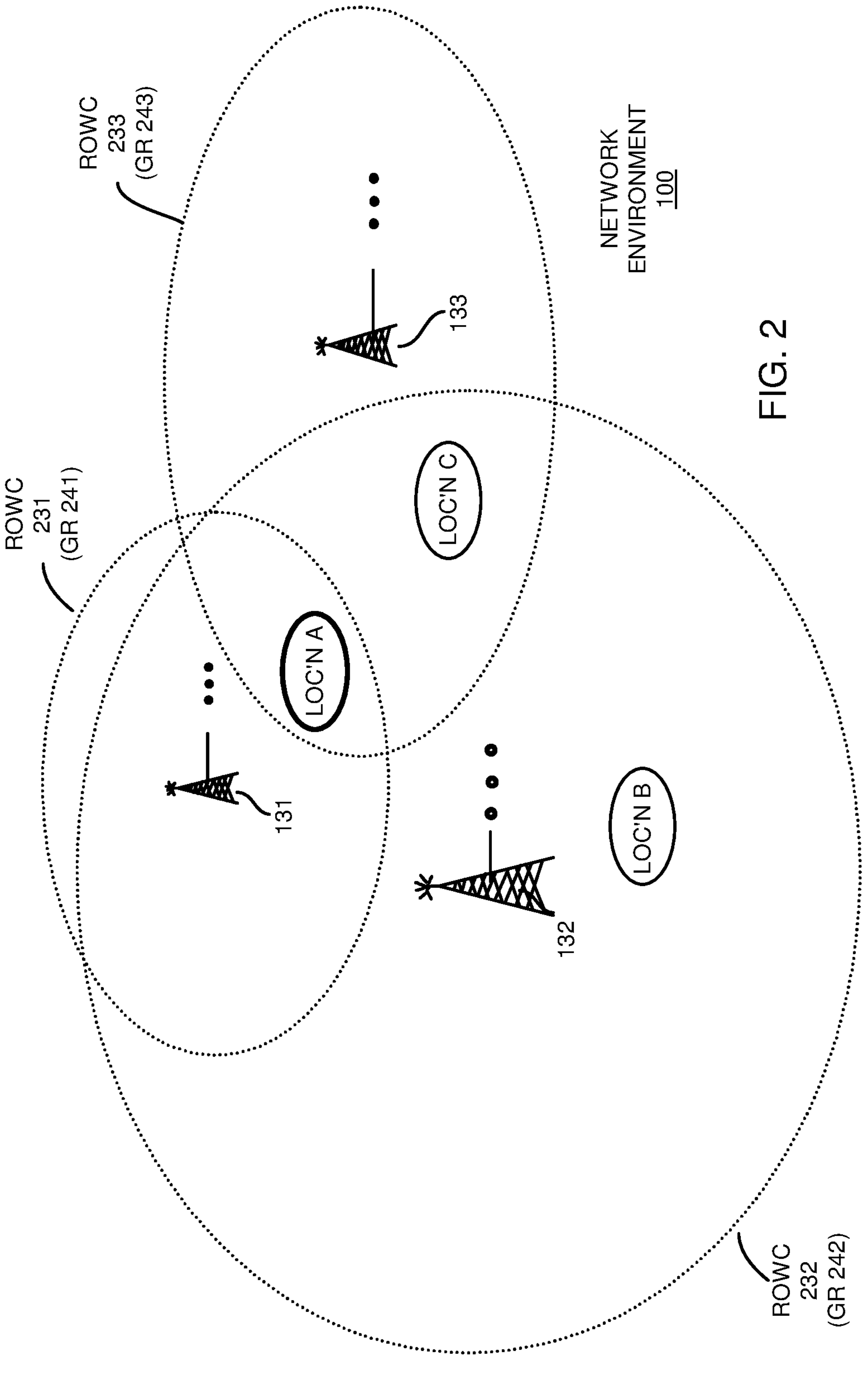
FIG. 2 is an example diagram illustrating different regions of wireless coverage supported by different wireless access points as discussed herein.

FIG. 2 is an example diagram illustrating different regions of wireless coverage supported by different wireless access points as discussed herein.

In this example, the wireless access point 131 supports wireless coverage to any communication devices within the region of wireless coverage 231 (a.k.a., geographical region 241). The wireless access point 132 supports wireless coverage to any communication devices within the region of wireless coverage 232 (a.k.a., geographical region 242). The wireless access point 133 supports wireless coverage to any communication devices within the region of wireless coverage 233 (a.k.a., geographical region 243).

As further shown, a communication device disposed at different locations in the wireless network environment 100 may be provided access to the remote network 190 through one or more wireless access points.

More specifically, a mobile communication device at location A resides within: i) region of wireless coverage 231, ii) region of wireless coverage 232, and iii) region of wireless coverage 233. Accordingly, any of the wireless access points including wireless access point 131, wireless access point 132, and wireless access point 133 are able to provide the communication device wireless access to the respective wireless access point and to remote network 190.

Further, a mobile communication device at location B resides only within region of wireless coverage 232 (geographical region 242). Accordingly, only wireless access point 132 is able to provide the communication device at location B wireless access to the remote network 190.

Still further, a mobile communication device at location C resides within: i) region of wireless coverage 232, and ii) region of wireless coverage 232. Accordingly, any of the wireless access points including wireless access point 132 and wireless access point 133 are able to provide the communication device wireless access to the remote network 190.

Figure 3:
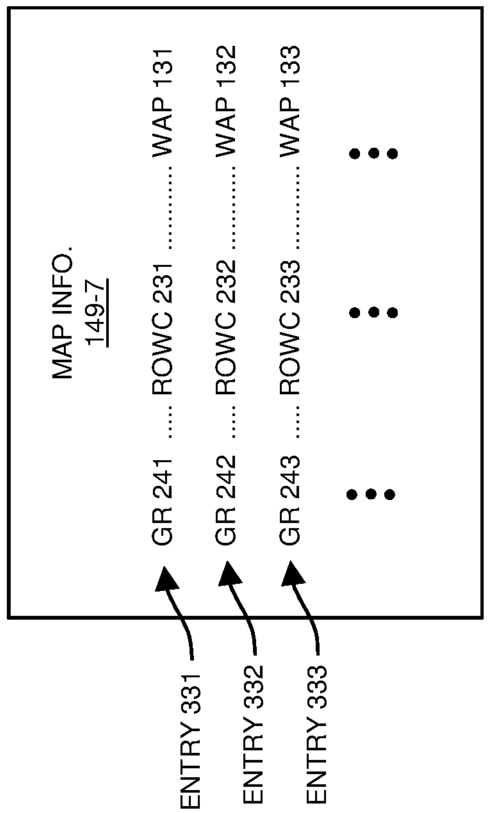
FIG. 3 is an example data flow diagram illustrating mapping of wireless access point identities to corresponding regions of wireless coverage control provided by the different wireless access points as discussed herein.

FIG. 3 is an example data flow diagram illustrating mapping of wireless access point identities to corresponding regions of wireless coverage control provided by the different wireless access points as discussed herein.

In this example, the service provider 301 (such as wireless network service provider X associated with Home network) or other suitable entity produces mapping information 149-7 based on region of wireless coverage and corresponding geographical region supported by a respective wireless access point.

For example, via first entry 331, mapping information 149-7 indicates that the wireless access point 131 potentially provides any communication devices in the region of wireless coverage 231 (a.k.a., corresponding geographical region 241) access through the wireless access point 131 to the remote network 190.

Via second entry 332, mapping information 149-7 indicates that the wireless access point 132 potentially provides any communication devices in the region of wireless coverage 232 (a.k.a., corresponding geographical region 242) access through the wireless access point 132 to the remote network 190.

Via third entry 333, mapping information 149-7 indicates that the wireless access point 133 potentially provides any communication devices in the region of wireless coverage 233 (a.k.a., corresponding geographical region 243) access through the wireless access point 133 to the remote network 190.

Figure 4:
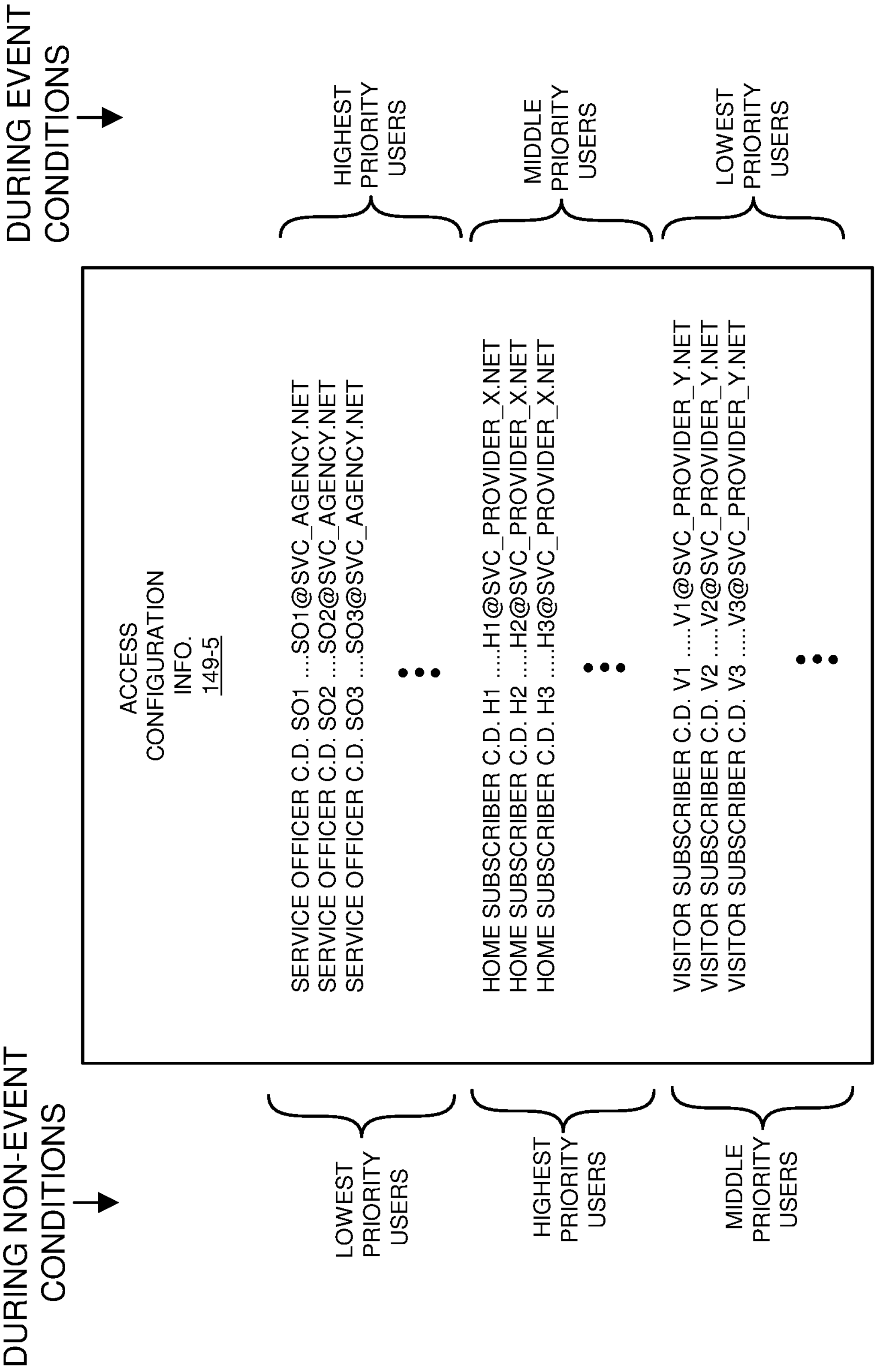
FIG. 4 is an example data flow diagram illustrating access control information for controlling access to different types of users as discussed herein.

FIG. 4 is an example data flow diagram illustrating access control information for controlling access to different types of users at different times as discussed herein.

As previously discussed, the wireless network service provider X or other suitable entity generates the corresponding access configuration information 149-5 to indicate the different levels of priority provided to the different possible users at different times (i.e., such as different events). The configuration access information 149-5 can be configured to include mapping of different events to different access settings. For example, some events may cause the communication management resource 110 as discussed herein to terminate all wireless connectivity of non-service officer communication devices; other events may cause the communication management resource 110 as discussed herein to simply reduce wireless bandwidth associated with wireless connectivity of non-service officer communication devices; and so on.

As shown via access configuration information 149-5, during non-event conditions, the wireless network service provider X (such as controlling operation of wireless access point 131, wireless access point 132, wireless access point 133, etc.) provides wireless services to corresponding subscribers including a first user operating the home communication device H1, a second subscriber operating a home communication device H2, a third subscriber operating a home communication device H3, etc.

As further shown, the access configuration information 149-5 can be configured to indicate the different identities of the communication devices to be provided wireless access to the corresponding remote network 190. The identity information enables the service provider X to control which communication devices are able to use respective wireless access points to wirelessly access the remote network 190.

In this example, the access configuration information 149-5 indicates that the home subscriber communication device H1 is assigned a unique identifier value of H1@SVC_PROVIDER_X.NET; the access configuration information 149-5 indicates that the home subscriber communication device H2 is assigned a unique identifier value of H2@SVC_PROVIDER_X.NET; the access configuration information 149-5 indicates that the home subscriber communication device H3 is assigned a unique identifier value of H3@SVC_PROVIDER_X.NET; and so on.

Further in this example, the wireless network service provider X (first wireless network service provider) has an agreement with a wireless network service provider Y (second wireless network service provider) in which the wireless network service provider X provides wireless connectivity to subscribers associated with wireless network service provider Y. Based on the agreement, the subscribers (operating respective so-called visitor communication devices) associated with the wireless network service provider Y may be provided a lower tier wireless service (such as lower wireless bandwidth) than the home subscribers associated with the wireless network service provider X.

For example, in accordance with the respective agreement, the wireless network service provider X (such as controlling operation of wireless access point 131, wireless access point 132, wireless access point 133, etc.) provides wireless services to corresponding visitor subscribers including a first visitor user operating the visitor communication device V1, a second visitor subscriber operating a visitor communication device V2, a third visitor subscriber operating a visitor communication device V3, etc.

The access configuration information 149-5 can be configured to indicate the different identities of the visitor communication devices to be provided wireless access to the corresponding remote network 190. The identity information enables the service provider X to control which communication devices are able to use respective wireless access points to wirelessly access the remote network 190.

In this example, the access configuration information 149-5 indicates that the home subscriber communication device H1 is assigned a unique identifier value of H1@SVC_PROVIDER_X.NET; the access configuration information 149-5 indicates that the home subscriber communication device H2 is assigned a unique identifier value of H2@SVC_PROVIDER_X.NET; the access configuration information 149-5 indicates that the home subscriber communication device H3 is assigned a unique identifier value of H3@SVC_PROVIDER_X.NET; and so on.

Additionally, the access configuration information 149-5 can be configured to indicate identities of different registered service officers and in corresponding service officer devices that will be provided use of the corresponding wireless network services offered by the wireless network service provider X during event conditions in which it is desirable to have the corresponding service officers of those service officer communication devices manage occurrence of events in the network environment 100.

In other words, the users or service officers and corresponding service officer communication devices may be provided temporary highest priority use of the wireless access points 131, 132, 133, etc., operated by the service provider X during event conditions such as event A.

More specifically, the access configuration information 149-5 in this example indicates the wireless network service provider X (such as controlling operation of wireless access point 131, wireless access point 132, wireless access point 133, etc.) potentially provides (on an as needed basis) wireless services to corresponding service officer communication devices including a first service officer user operating the service officer communication device SO1, a second service officer user operating service officer communication device SO2, a third service officer operating a service officer communication device SO3, etc.

The access configuration information 149-5 can be configured to indicate the different identities of the communication devices to be provided controlled wireless access to the corresponding remote network 190 during event conditions. For example, the access configuration information 149-5 indicates that the service officer communication device SO1 is assigned a unique identifier value of SO1@SVC_AGENCY.NET; the access configuration information 149-5 indicates that the service officer communication device SO2 is assigned a unique identifier value of SO2@SVC_AGENCY.NET; the access configuration information 149-5 indicates that the home subscriber communication device SO3 is assigned a unique identifier value of SO3@SVC_AGENCY.NET; and so on.

As further shown, during non-event conditions such as when no event occurs, the one or more communication management resources associated with the wireless network service provider X provides different levels of wireless service to the corresponding home subscriber communication devices and the visitor subscriber communication devices.

For example, during non-event conditions such as when event A does not occur, the wireless network service provider X provides highest priority use of the corresponding available bandwidth associated with the wireless access points to the home subscriber communication devices. The visitor subscriber communication devices are able to use the wireless access points if extra bandwidth is available for allocation to them. During the non-event conditions, the service officers operating the respective service officer communication devices are not afforded access to the network or are afforded only low-level (such as low bandwidth) access to the use of the wireless access points access the remote network 190.

However, during certain type of detected event conditions, such as during event A, one or more of the service officers and corresponding service officer communication devices are provided use of the wireless services provided by the wireless access points associated with the wireless network service provider X. For example, as previously discussed, the service officers and corresponding service officer communication devices may be provided the highest priority access to manage a corresponding event A. If extra wireless bandwidth is available after providing appropriate bandwidth to any service officer communication devices during the event condition, the home subscriber communication devices may be provided wireless services at a second priority level, which is less than the prior highest priority access level assigned to the service offices and corresponding service officer communication devices. If wireless bandwidth is generally unavailable, note that the home communication devices and the visitor communication devices may not be provided any wireless network services during the event A condition so that the appropriate wireless bandwidth is available for use by the one or more service officers and corresponding service officer communication devices assigned to manage the respective detected event condition.

Figure 5:
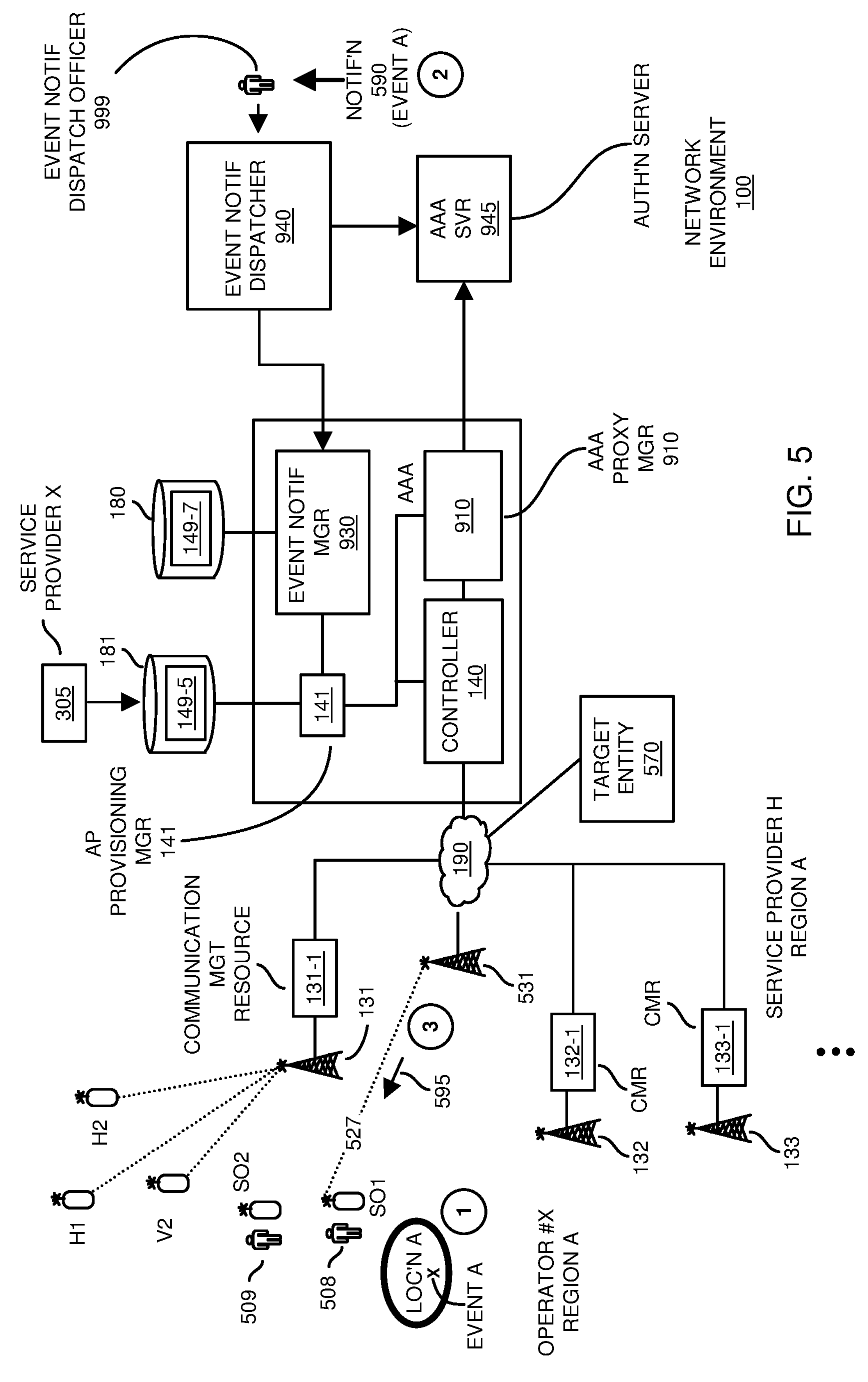
FIG. 5 is an example diagram illustrating detection of an event in a network environment and providing notification of the event to a service officer as discussed herein.

FIG. 5 is an example diagram illustrating a wireless network environment supporting priority wireless access control amongst service officer communication devices versus home or visitor communication devices as discussed herein.

In this example, in operation #1, an event A occurs at location A in the network environment 100. The dispatch entity 999 (such as a human, computer service, etc.) receives notification 590 of a respective event A in operation #2. The notification 590 may be generated at the time of the event A or the event may be pre-scheduled to occur at a particular time. The notification 590 may include any suitable information associated with the event A such as location anywhere the event occurred, the type of event A that occurred, details of the event A, etc. The notification 590 can be received from any resource such user experiencing the event A, bystander seeing the event A, etc. The event A may be a concert, where service officers provide assistance to persons attending the concert.

In operation #3, the dispatch entity 999 or other suitable entity provides notification 595 of the detected event A to the service officer communication device SO1. The user 508 (such as a service officer) may be trained to manage logistics or other aspects associated with the event A.

Note further that the notification 595 can be conveyed over any suitable communication connection (such as physical connection, wireless connection, or a combination of physical connection and wireless connection) between the dispatch officer 999 and the corresponding service officer communication device SO1.

For example, the event notification dispatch officer 999 may operate a respective phone device resulting in communication of a respective call alert from the wireless base station 531 (such as a cell phone tower) over wireless communication link 527 to the service officer communication device SO1. The user 508 detects the incoming alert as indicated by the service officer communication device SO1 and accepts the corresponding call. Via voice or text communications, the dispatch officer 999 provides notification of the corresponding event A and location A to the service officer 508. in response to receiving the location information and event information, the user 508 goes to the location A to manage the corresponding event A. Accordingly, the user 508 (such as service officer) operating the service officer communication device SO1 is notified of the event A and corresponding attributes of the event A.

Figure 6:
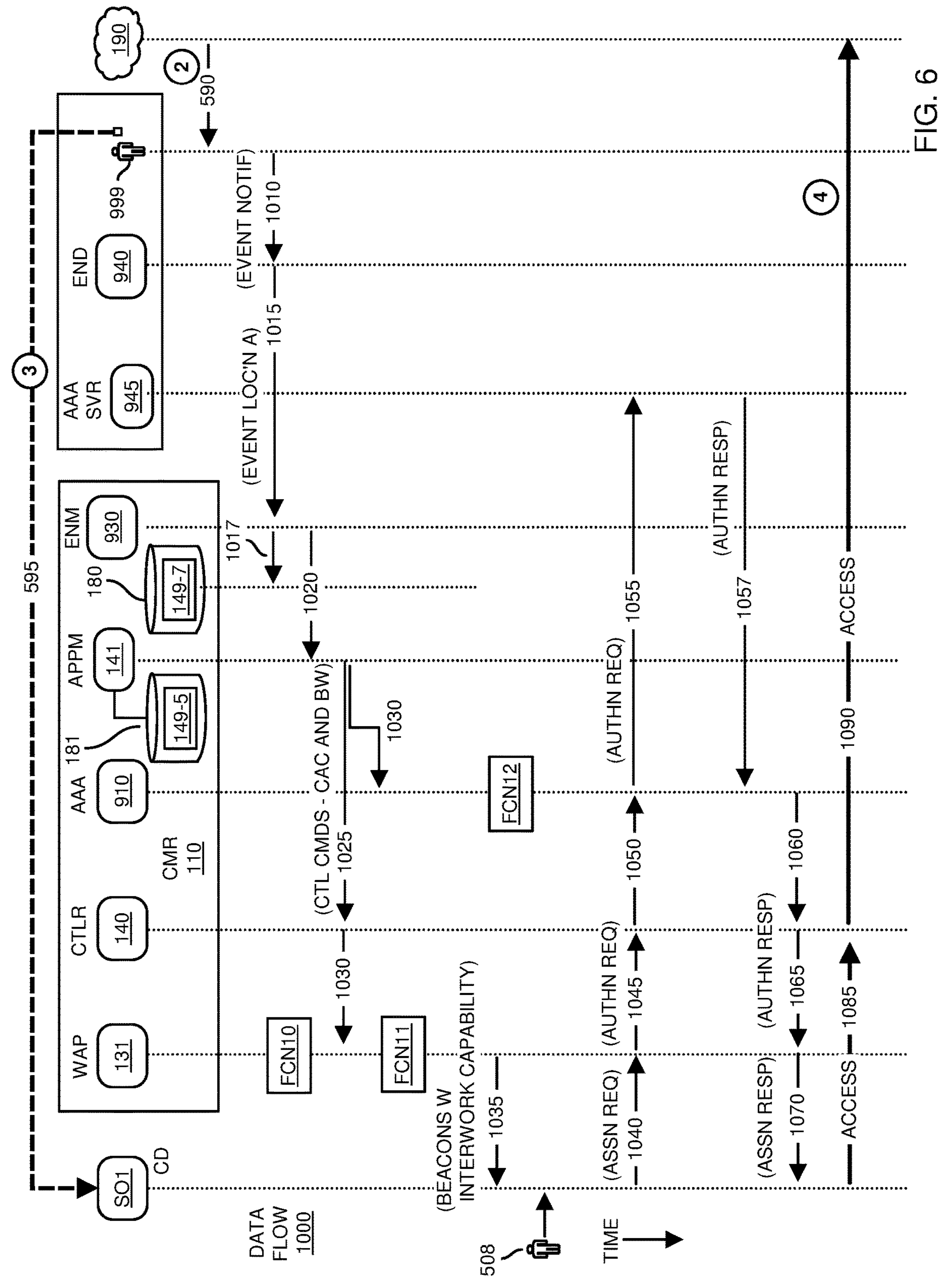
FIG. 6 is an example data flow diagram illustrating wireless access control for a service officer communication devices as discussed herein.

FIG. 6 is an example data flow diagram illustrating wireless access control for one or more service officer communication devices as discussed herein.

In general, the system as discussed herein supports the following functions.

Active site identified by agency (or) event responders send notification to operator's event notification manager (ENM) system using their event notification dispatcher (END) system, with active site details.

Operator's ENM issues the automated commands to respective network elements serving the active site (AP's, Controllers, AAA, Gateways)

Depending on the type of event notification & serving network conditions, network elements will implement appropriate actions, like below: Pre-empt all connected devices, allow only respective security/first respondent users.

Apply reduced bandwidth policies to nonpriority users

Only allow security-agency users for a period of time etc.

Allow security users direct internet access, without performing authentication on user's identity/Authentication server More specifically, as previously discussed, at operation #1, an event A occurs. The dispatch entity 999 (such as a human, computer service, etc.) receives notification 590 of the event A (such as including location and other details indicating a type associated with the event) in operation #2. The notification 590 may be generated at the time of the event A or the event may be pre-scheduled to occur at a particular time. The notification 590 may include any suitable information associated with the event A such as location A where the event occurred, the type of event A that occurred, details actors and actions of people associated with the event A, description of parties associated with the event A, etc.

In operation #3, the dispatch entity 999 or other suitable entity can be configured to provide notification 595 of the detected event A to the service officer communication device SO1. The user 508 (or service officer) may be trained to manage logistics associated with the event A.

As previously discussed, note again that the notification 595 can be conveyed over any suitable communication connection (such as physical connection, wireless connection from a wireless radio system, or a combination of physical connection and wireless connection) between the dispatch and 999 and the corresponding service officer communication device SO1. Accordingly, the user 508 (such as service officer) operating the service officer communication device SO1 is notified of the event A and corresponding attributes of the event A. The user 508 visits the location A as indicated by the notification 595.

Via further communications 1010, the dispatch entity 999 provides notification of the event A (and corresponding information) to the event notification dispatcher 940.

Via further communications 1015, the event notification dispatcher 940 forwards the notification of the event A (such as including attributes of the event A including location A of the event, type of the vent, details of the event, etc.) to the event notification manager 930. Note that the location A of the event A included in the notification (communications 1010) of the event A can include any information such as latitude, longitude, street and building number, city, landmark information, etc., indicating the location A. Additionally, as previously discussed, the communications may include information describing the type of event, specific details of the event, etc.

In one example, via the communications 1017, the event notification manager 930 accesses the repository 180 and corresponding map information 149-7. As previously discussed, the map information 149-7 can be configured to include a mapping of different wireless access points and corresponding geographical regions serviced by those wireless access points. In this example, the notification manager 930 maps the location A of the event A to multiple different wireless access points capable of providing wireless connectivity of a mobile communication device (or user equipment such as service officer communication device SO1) at location A to the remote network 190.

More specifically, the event notification manager 930 determines from map information 149-7 and general available map information that the location A resides in the region of wireless coverage 231 (geographical region 241), region of wireless coverage 242 (geographical region 242), and region of wireless coverage 233 (geographical region 243). In such an instance, the event notification manager 930 determines that any of the wireless access points including wireless access point 131, wireless access point 132, and wireless access point 133 are potential candidates to provide the corresponding service officer communication device SO1 and user 508 wireless access to the remote network 190.

As further shown, in furtherance of supporting the user 508 and corresponding management of the event A, the notification manager 930 produces communications 1020 indicating attributes of the event A (such as location A, type of the event A, time of the event A, details of event, type, etc.) to the access point provisioning manager 141. Additionally, via communications 1020, the event notification manager 930 can be configured to communicate corresponding list of the different wireless access points (131, 132, 133) that are able to provide the service officer communication device SO1 and corresponding user 508 supplemental wireless access to the remote network 190. In other words, as previously discussed, the wireless communication link 527 (FIG. 5) can be configured to provide the user 508 and corresponding service officer communication device 508 initial (or limited) wireless access to the remote network 190.

As further discussed, it may be desirable to provide the service officer communication device SO1 one or more supplemental wireless communication links through one or more of wireless access points 131, 132, and 133. The one or more supplemental communication links, if used by the service officer and corresponding service officer communication device, provide the corresponding user 508 redundancy with respect to accessing remote network 190 and/or simply provide increased or highest priority data rates for communicating video data, audio data, etc., associated with the event A over path 721 between the service officer communication device SO1 and a corresponding second communication device such as target entity 570 (a.k.a., remote communication device) or other target entity in the network environment 100.

Note that the second or remote target communication device in network environment 100 to which the service officer communication device SO1 communicates information associated with the event A may vary. In other words, after the user 508 and corresponding service officer communication device SO1 are provided network access via the supplemental wireless communication link 528 in FIG. 7 and possibly one or more other wireless communication links between the service officer communication device SO1 and the wireless access point 132 and/or wireless access point 133; the service officer communication device 128 is able to communicate with any entity in the network environment 100.

Referring again to FIG. 6, in one example, via communications 1020, the event notification manager 930 is notified of one or more service officers and corresponding identities of the service officer communication devices (such as including identity SO1@SVC_AGENCY.NET or specific network address assigned to the service officer communication device SO1) that have been selected to manage the respective event A occurring at location A.

As further shown, the access point provisioning manager 141 receiving communications 1020 has access to the corresponding map information 149-5 stored in repository 181. As previously discussed, the map information 149-5 indicates the different levels of priority provided to the different types of users and communication devices during different conditions. For example, during non-event conditions, in general, the available wireless bandwidth associated with one or more wireless access points operated by the wireless network service provider X is provided to the home subscriber communication devices and the visitor subscriber communication devices. However, in this example, the access point provisioning manager 141 is notified that there is an event A (such as type #1) that occurs requiring a change in the priority of allocating use of the different available wireless bandwidth to the different communication devices.

More specifically, via receipt of communications 1020, the access point provisioning manager 141 is notified of the event A at location A as well as the corresponding one or more wireless access points in the network environment 100 and are able to provide service officer communication devices wireless access using the wireless access points 131, 132, 133, etc. As previously discussed, the communications 1020 can further indicate the identity of a particular service officer communication device such as the service officer communication device SO1 being provided the temporary access the wireless access point 131 to manage the corresponding event A location A.

Via wireless access control function FCN10, prior to receiving control information to adjust the allocation of wireless bandwidth in the network environment 100, the wireless access point 131 or other suitable entity keeps track of active clients using respective wireless services such as home subscribers (such as communication device H1, communication device H2, etc.) or visitor roaming subscribers (such as communication device V2) or service officer communication devices using the wireless access point 131 to access network 190. In a similar manner, each of the wireless access points keeps track of wireless bandwidth usage. Tracking of the respective usage of each of the wireless access points enables the control function FCN10 to know of current loading of the wireless network and whether sufficient bandwidth is available to provide to the one or more service officers notified to manage the event A.

Note that the communications 1020 may further indicate one or more specific service officer communication devices (such as service officer communication device SO1 and service officer communication device SO2) are to be provided the higher priority access during the event A. Alternatively, the communications 1020 may indicate that any service officer communication device and are about the geographical regions 241, 242, and 243 are provided temporary high priority access through a respective wireless access points 131, 132, 133, etc., to the remote network 190.

Based on a detected change in priority associated with allocation of the available wireless bandwidth in response to detecting the occurrence of event A as indicated by the communications 1020, the access point provisioning manager 141 uses the map information 149-5 to determine that service officer communication device SO1 and service officer communication device SO2 are to be provided high priority use of the wireless access points 131, 132, 133, etc., operated by the wireless network service provider X to support the event A. Based on the detected new priority of using wireless services, the access point provisioning manager 141 generates respective bandwidth control commands for execution by the wireless access point 131. The generated bandwidth control commands can be configured to indicate to provide high priority of available wireless bandwidth to the one or more service officer communication devices specified by the communications 1020. The generated commands can be configured to indicate the identities of the service officer communication devices SO1 (such as identity SO1@SVC_AGENCY.NET or specific network address assigned to the service officer communication device SO1) and SO2 (such as identity SO2@SVC_AGENCY.NET or specific network address assigned to the service officer communication device SO1) that are to be provided the high-priority bandwidth usage.

The access point provisioning manager 141 then forwards the appropriate bandwidth control commands to the controller 140 via communications 1025. As previously discussed, the controller 140 controls operation of the different wireless access points operated by the wireless network service provider X.

Via communications 1030, the controller 140 also forwards the appropriate bandwidth and control commands, identities of the service officers and corresponding identities of the service officer communication devices to the authentication management resource 910 as well, to the wireless access point 131. In other words, the communications 1030 can be configured to indicate the identities of the service officer communication devices SO1 (such as identity SO1@SVC_AGENCY.NET or specific network address assigned to the service officer communication device SO1) and SO2 (such as identity SO2@SVC_AGENCY.NET or specific network address assigned to the service officer communication device SO1) to be provided high priority use of the wireless network bandwidth associated with the wireless access points operated by the wireless network service provider X. The purpose of providing notification of the identities of the service officer communication devices is to ensure that such devices can be authenticated for use of respective wireless services as further discussed herein.

As previously discussed, as an alternative to providing only certain service officers and corresponding service officer communication devices the high priority access to manage the corresponding event A at location A, the controller 140 can be configured to provide any of the service officers and corresponding service officer communication devices in the access configuration information 149-5 high priority use of the available wireless bandwidth provided by the wireless access point 131 or other wireless access points 132, 133, etc.

Thus, via communications 1030, the controller 140 provides notification to the wireless access point 131 of site-specific commands associated with the event A as well as corresponding CAC (Call Admission Control) and bandwidth policies in which to implement during the detected event A condition.

As previously discussed, via communications 1030, the controller 140 is configured to notify the wireless access point 131 to reduce the wireless bandwidth used by other communication devices so that the freed up wireless bandwidth can be used to support the new wireless communication link 528 established between the service officer communication device SO1 in the wireless access point 131.

Via wireless access control function FCN11, the wireless access point 131 performs one or more of the following: i) preempts one or more connected devices such as by terminating their access to the remote network through the wireless access point 131, ii) applies reduce bandwidth policies to non-priority users, iii) allows the service officer communication device and corresponding user 508 use of supplemental available wireless connectivity 528 through the wireless access point 131 for limited time.

Figure 7:
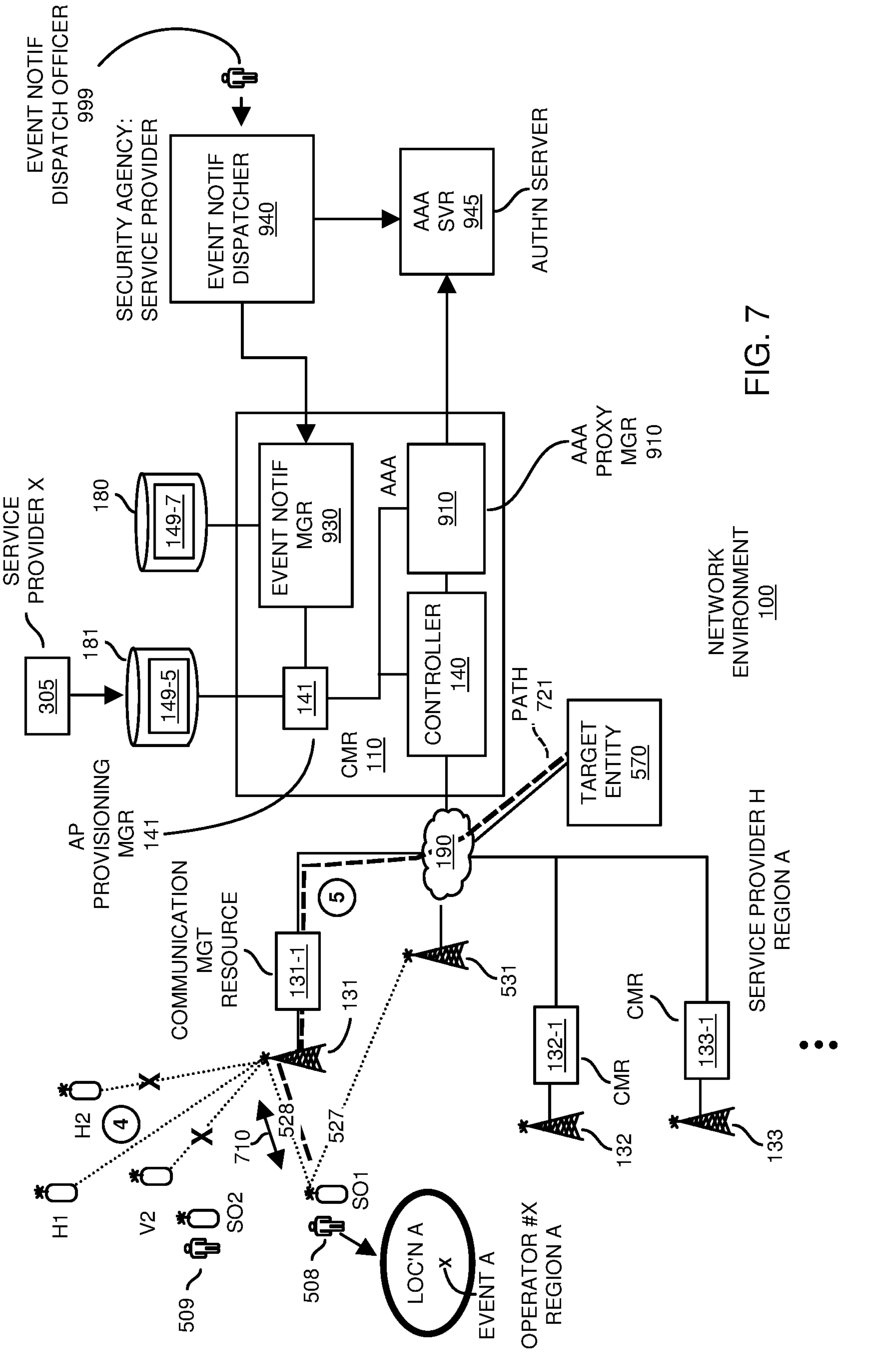
FIG. 7 is an example diagram illustrating wireless access control for a service officer communication device as discussed herein.

More specifically, in operation #4 shown in FIG. 7, in response to receiving notification (such as via communications 1025) to reduce wireless bandwidth provided by the non-service officer communication devices such as home subscriber's communication device H2 and visitor communication device V2, the communication management resource 131-1 and corresponding wireless access point 131 discontinue providing wireless services to the home subscriber communication device H2 and the visitor communication device V2. This frees up respective bandwidth as previously discussed. For example, prior to the occurrence of the event A, the home subscriber communication device H2 may have been provided 30 MBS (MegaByte per Second) or other suitable amount of wireless bandwidth to wirelessly communicate with the wireless base station 131; the visitor subscriber communication device V2 may have been provided 20 MBS (megabyte per second) or other suitable amount of wireless bandwidth to wirelessly communicate with the wireless base station 131. Terminating and/or reducing wireless bandwidth associated with the respective wireless communication links between the wireless access point 131 and each of the home communication device H2 in the visitor communication device V2 frees up a total of 50 MBS or other amount of bandwidth for use by the wireless communication link 528.

Referring again to FIG. 6, via communications 1035 (such as one or more beacons communicated from the wireless access point 131), the wireless access point 131 provides notification of interworking capabilities indicating that the wireless access point 131 supports multiple service providers in a manner as previously discussed. In other words, the communications 1035 provide notification to the service officer communication device SO1 and the service officer communication device SO2 of the availability of the corresponding wireless access point 131 to access the remote network 190.

In this example, as previously discussed, the service officer communication device SO1 is operated by a respective user 508 such as a service officer trained to manage the corresponding event A. In response to receiving the notification of available network resources such indicated in wireless communications 1035, and in response to receiving notification 595, the communication device SO1 transmits a respective association request via communications 1040 (such as including identity of the service officer communication device SO1 which is SO1@SVC_AGENCY.NET or specific network address assigned to the service officer communication device SO1) to the wireless access point 131. The service officer operating the service officer communication device SO1 requests to use the wireless bandwidth associated with the wireless access point 131.

Note that, via wireless access control function FCN12, the authentication management resource 910 performs one or more of the following: i) preempts one or more connected devices, ii) applies reduced bandwidth policies to non-priority users, iii) only allow security agency users use of wireless connectivity through the wireless access point 131 for limited time, iv) allow security users use of the wireless access point 131 and wireless connectivity without authenticating them.

More specifically, in this example, via communications 1040, the communication device SO1 operated by the security officer user 508 communicates a respective association request (for use or wireless bandwidth) to the wireless access point 131. In response to receiving the association request in communications 1040, the wireless access point 131 communicates a respective authentication request via communications 1045 including an identity of the requesting service officer communication device SO1@SVC_AGENCY.NET or specific network address assigned to the service officer communication device SO1 to the controller 140. The controller 140 forwards the authentication request via the communications 1050 including an identity of the requesting service officer communication device SO1@SVC_AGENCY.NET or specific network address assigned to the service officer communication device SO1 to the function FCN12 associated with the authentication management resource 910.

The authentication management resource 910 further forwards the authentication request in communications 1055 such as including an identity of the requesting service officer communication device SO1@SVC_AGENCY.NET or specific network address assigned to the service officer communication device SO1 to the authentication server 945 (a.k.a., authentication management resource).

The authentication server 945 authenticates the corresponding user 508 and/or the corresponding service officer communication device SO1 and communicates a respective authentication response in communications 1057 to the allocation management resource 910.

The function FCN12 of the authentication management resource 910 further communicates the authentication response (such as that the service officer communication device SO1 has been authenticated or verified and may use wireless services) in communications 1060 to the controller 140. The controller 140 forwards the authentication response in communications 1065 to the wireless access point 131. The wireless access point 131 further forwards the association response (acceptance granting use of wireless services through the wireless access point 131) in communications 1070 to the communication device SO1.

Thereafter, as shown in FIG. 7, the user 508 and corresponding service officer communication device SO1 are provided high priority wireless connectivity (such as over wireless communication link 528 and/or the network path 721 or other suitable path) through the wireless access point 131 to the network 190 via communications 1085 and communications 1090.

FIG. 7 is an example diagram illustrating wireless access control for a service officer communication device as discussed herein.

As previously discussed, the usage of the wireless access point 131 can be adjusted to ensure that the service officer communication device SO1 is able to use corresponding wireless services without experiencing network congestion.

For example, the controller 140 provides notification to the controller 131-1 and the wireless access point 131 to discontinue providing wireless access to lower priority communication devices including visitor communication device V2. The controller 140 can be configured to provide notification to the controller 131-1 and the wireless access point 131 to reduce an amount of wireless bandwidth provided to the lower priority home communication device H2.

In such an instance, in operation #4, the wireless access point 131 terminates the wireless communication link with the visitor communication device V2, preventing the corresponding user associated with the visitor communication device V2 from accessing the network 190. Additionally, in response to receiving the control information from the controller 140, the wireless access point 131 reduces or terminates completely an amount of wireless bandwidth provided to the home communication device H2 to access the network 190.

In operation #5, the wireless bandwidth now available as a result of terminating the wireless connectivity between the wireless access point 131 and the visitor communication device V2 and the wireless bandwidth associated with the bandwidth reduction (such as 50 MBS) applied to the wireless connectivity between the wireless access point 131 and the home communication device is then allocated for use by the service officer communication device SO1 and corresponding wireless communication link 528 to support wireless communications 710. As previously discussed, the service officer communication device SO1 then uses the allocated wireless bandwidth (such as 50 MBS) to communicate with any entities in the network environment 100.

If desired, or if needed, the wireless bandwidth allocated to any number of wireless communication link supported by the wireless access point 131 can be terminated or reduced in order to allocate the corresponding freed up wireless bandwidth (such as the 50 MBS as previously discussed) to support wireless communication link 528 for use by the service officer communication device SO1.

Note that the wireless communication link 131 may fail. In such an instance, the service officer communication device SO1 can be configured to communicate with the wireless access point 132 to wirelessly access the remote network 190 through the wireless access point 132. Additionally, or alternatively, the service officer communication device SO1 can be configured to establish dual wireless connectivity such as simultaneously with both the first wireless access point 131 and the second wireless access point for redundancy.

Yet further, during management of the event A and time duration in which the service officer communication device SO1 is provided highest priority use of the wireless bandwidth associated with wireless access point 131, the service officer communication device SO1 can be configured to execute a respective video application of capturing video and/or audio images of the event A at location A. The executed video application can be configured to communicate the video and/or audio images over the past 721 to a respective target entity 570.

Accordingly, the communication management resource 110 receives location information indicating a location A of an event A in the network environment 100. Via the event notification manager 930 associated with the communication management resource 110, the communication management resource 110 determines a wireless access point 131 in a vicinity of the location A as specified by the location information A. The communication management resource 110 then controls flow of first data through the wireless access point 131 in accordance wireless access point control information to support wireless communications such as communications 710 associated with the event A.

Figure 8:
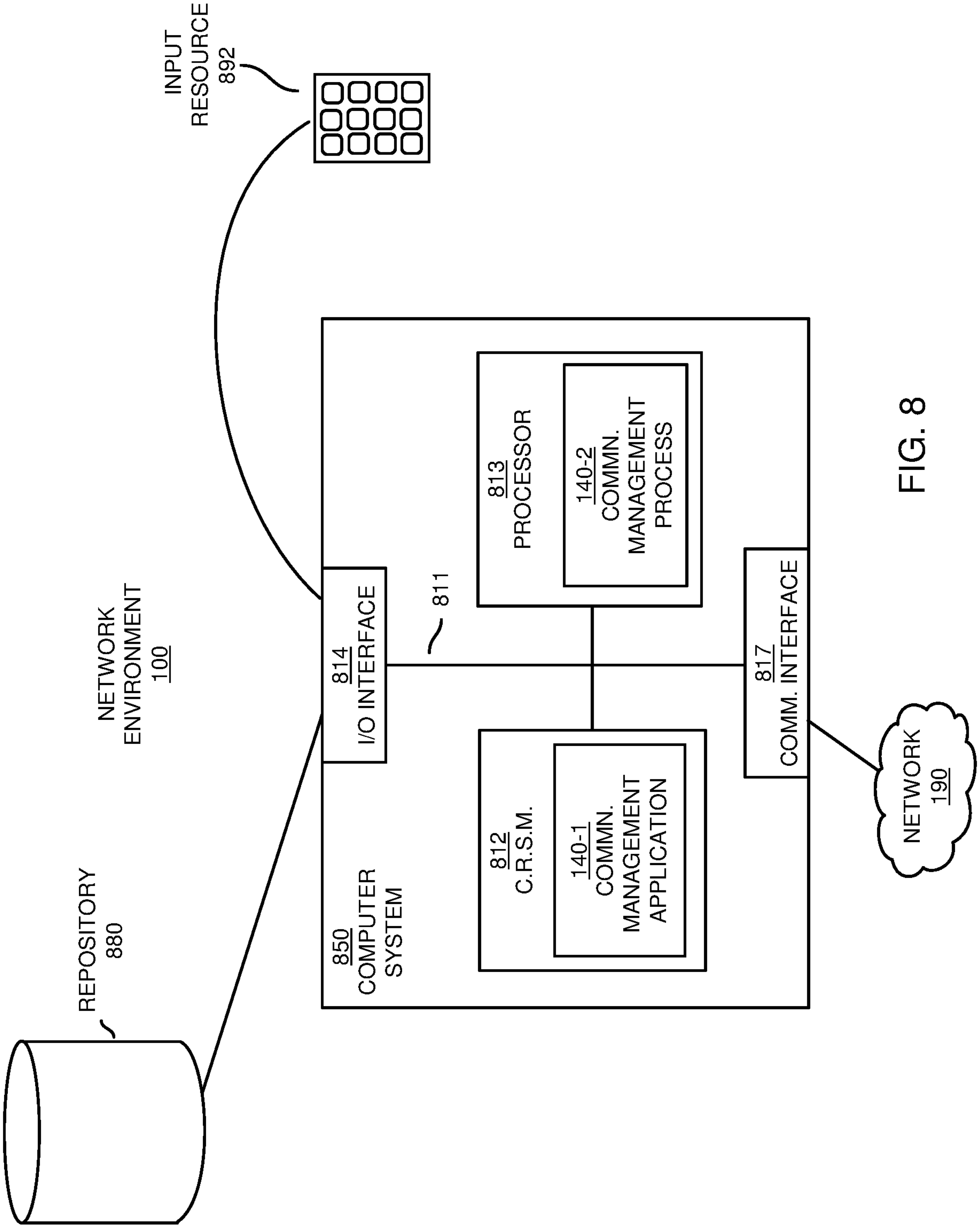
FIG. 8 is a diagram illustrating example computer architecture operable to execute one or more operations as discussed herein.

FIG. 8 is an example block diagram of a computer system for implementing any of the operations as previously discussed according to embodiments herein.

Note that any of the resources (such as home communication device H1, home communication device H2, visitor communication device V2, so communication device SO1, so communication device SO2, wireless base station 531, wireless access point 131, wireless access point 132, controller 140, authentication management resource 910, event notification manager 930, access point provisioning manager 141, communication management resource 110, communication management resource 610, authentication server 945, etc.) as discussed herein can be configured to include computer processor hardware, analog/digital circuitry, and/or corresponding executable instructions to carry out the different operations as discussed herein.

As shown, computer system 850 of the present example includes an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface(s) 814 supports connectivity to repository 880 and input resource 892.

Computer readable storage medium 812 (such as computer-readable storage hardware) can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the management application 140-1 produces management process 140-2 to carry out any of the operations and/or processes as discussed herein.

Those skilled in the art will understand that the computer system 850 can include other processes and/or software and hardware components, such as an operating system that controls allocation and use of hardware resources to management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 9. Note that the steps in the flowcharts below can be executed in any suitable order.

Figure 9:
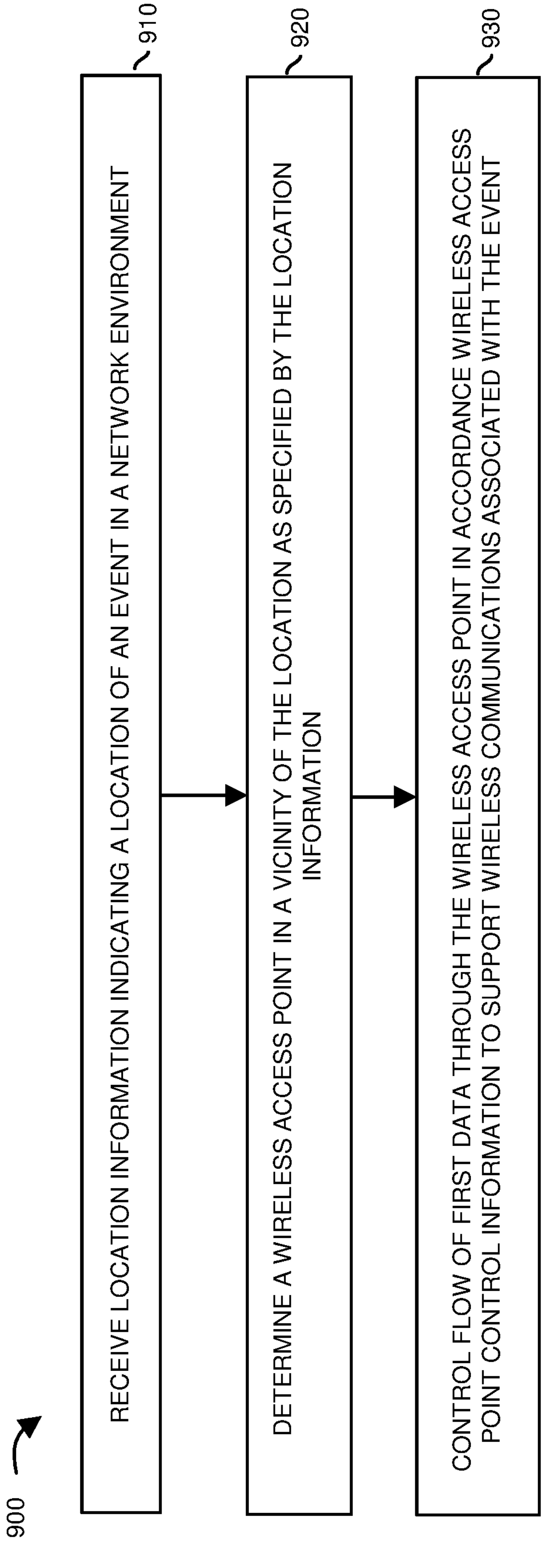
FIG. 9 is an example diagrams illustrating methods as discussed herein.

FIG. 9 is a flowchart 900 illustrating an example method according to embodiments herein. Note that there will be some overlap with respect to concepts as discussed above.

In processing operation 910, the communication management resource 110 receives location information indicating a location of an event in a network environment 100.

In processing operation 920, the communication management resource 110 determines a wireless access point in a vicinity of the location as specified by the location information.

In processing operation 930, the communication management resource 110 controls flow of first data through the wireless access point in accordance wireless access point control information to support wireless communications associated with the event.

Note again that techniques herein are well suited to facilitate improved use of bandwidth available in a wireless network during events in which it is desirable to provide service officers high priority use of other users. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

receiving location information indicating a location of an event in a network environment;

transmitting a notification to a user of a first mobile communication device, the notification notifying the user of the event and the location of the event;

determining a first wireless access point in a vicinity of the location as specified by the location information;

generating wireless access point control information; and notifying the first wireless access point to control flow of first data between the first wireless access point and the first mobile communication device in accordance with the wireless access point control information, the wireless access point control information supporting wireless communications associated with the event between the first mobile communication device and the first wireless access point;

wherein the notification is transmitted from a wireless base station to the first mobile communication device, the wireless base station disparately located with respect to the first wireless access point, the transmitted notification notifying the user to manage the event;

wherein a first wireless communication link supports first wireless connectivity between the first mobile communication device and the wireless base station, the method further comprising: establishing a second wireless communication link between the first wireless access point and the first mobile communication device, the second wireless communication link supporting second wireless connectivity; and wherein the first wireless communication link and the second wireless communication link support simultaneous conveyance of communications.

2. A method comprising:

receiving location information indicating a location of an event in a network environment;

transmitting a notification to a user of a first mobile communication device, the notification notifying the user of the event and the location of the event;

determining a first wireless access point in a vicinity of the location as specified by the location information;

generating wireless access point control information; and notifying the first wireless access point to control flow of first data between the first wireless access point and the first mobile communication device in accordance with the wireless access point control information, the wireless access point control information supporting wireless communications associated with the event between the first mobile communication device and the first wireless access point;

wherein controlled flow of the first data between the first wireless access point and the first mobile communication device is operative to provide reduced bandwidth to a second mobile communication device in communication with a remote network through the first wireless access point in order to provide the first mobile communication device increased bandwidth through the first wireless access point to access the remote network; and wherein the transmitted notification notifies the user of the first mobile communication device to manage the event at the first location, the notification included in wireless signals transmitted from a wireless base station disposed in the vicinity of the location, the wireless base station disparately located with respect to the first wireless access point.

3. The method as in claim 2, wherein the first data is obtained by the user of the first mobile communication device monitoring the event at the location.

4. The method as in claim 1 further comprising:

determining that the event is of a first type of event amongst multiple possible types of events; and generating the wireless access point control information to support conveyance of the first data, the first data including images of the event as captured by the first mobile communication device.

5. The method as in claim 1 further comprising:

assigning an expiration value to the wireless access point control information, the expiration value indicating a duration of time in which the wireless access point control information is assigned to control the flow of the first data through the wireless access point.

6. The method as in claim 1 further comprising:

assigning a unique identifier value associated with the first mobile communication device to the wireless access point control information.

7. The method as in claim 6 further comprising:

receiving a message communicated from the first mobile communication device, the message requesting use of the first wireless access point to access a remote network;

obtaining a source identity value from the message, the source identity value indicating an identity of the first mobile communication. device communicating the message; and in response to detecting that the source identity value in the received message matches the unique identifier value assigned to the wireless access point control information, providing the first mobile communication device use of the first wireless access point to access the remote network.

8. The method as in claim 1 further comprising:

tracking use of the first wireless access point in the vicinity of the location of the event to provide wireless connectivity of multiple instances of mobile communication devices access to a remote network; and subsequent to receiving the wireless access point control information, controlling operation of the wireless access point in accordance with the wireless access point control information to provide wireless connectivity of the first mobile communication device through the first wireless access point to the remote network.

9. The method as in claim 1 further comprising:

receiving a request from the first mobile device for connectivity through the first wireless access point to a remote network; and in response to detecting that the first communication device has been authorized to establish the connectivity during implementation of the wireless access point control information at the first wireless access point, providing the first communication device access through the first wireless access point to the remote network.

10. A system comprising:

communication management hardware operative to:

receive location information indicating a location of an event in a network environment;

transmit a notification to a user of a first mobile communication device, the notification notifying the user of the event and the location of the event;

determine a first wireless access point in a vicinity of the location as specified by the location information;

generate wireless access point control information; and notify the first wireless access point to control flow of first data between the first wireless access point and the first mobile communication device in accordance with the wireless access point control information, the wireless access point control information supporting wireless communications associated with the event between the first mobile communication device and the first wireless access point;

wherein the notification is transmitted from a wireless base station to the first mobile communication device, the wireless base station disparately located with respect to the first wireless access point, the transmitted notification notifying the user to manage the event;

wherein a first wireless communication link supports first wireless connectivity between the first mobile communication device and the wireless base station, the communication management hardware further operative to establish second wireless communication link between the first wireless access point and the first mobile communication device, the second wireless communication link supporting second wireless connectivity; and wherein the first wireless communication link and the second wireless communication link support simultaneous conveyance of communications.

11. The system as in claim 10, wherein controlled flow of first data between the first wireless access point and the first mobile communication device is operative to provide reduced bandwidth to a second mobile communication device in communication with a remote network through the first wireless access point in order to provide the first mobile communication device increased bandwidth through the first wireless access point to access the remote network.

12. The system as in claim 10, wherein the communication management resource is further operative to:

assign a unique identifier value associated with the first mobile communication device to the wireless access point control information.

13. The system as in claim 12, wherein the communication management resource is further operative to:

receive a message communicated from the first mobile communication device, the message requesting use of the first wireless access point to access a remote network;

obtain a source identity value from the message, the source identity value indicating an identity of the first mobile communication device communicating the message; and in response to detecting that the source identity value in the received message matches the unique identifier value assigned to the wireless access point control information, provide the first mobile communication device use of the first wireless access point to access the remote network.

14. The method as in claim 2, wherein the notification is transmitted from a wireless base station to the first mobile communication device, the wireless base station disparately located with respect to the first wireless access point.

15. The method as in claim 14, wherein a first wireless communication link supports first wireless connectivity between the first mobile communication device and the wireless base station, the method further comprising:

establishing a second wireless communication link between the first wireless access point and the first mobile communication device, the second wireless communication link supporting second wireless connectivity.

16. The method as in claim 15, wherein the first wireless communication link and the second wireless communication link support simultaneous conveyance of communications.

17. The method as in claim 1, wherein the first mobile communication device is assigned a unique identifier value; and wherein the wireless access point control information indicates to support conveyance of communications including the assigned unique identifier value through the first wireless access point to a remote network.

18. The method as in claim 1 further comprising:

in response to receiving notification of the event, notifying an authentication resource of an identity of the first mobile communication device; and via the wireless access point control information, notifying the first wireless access point to provide the first mobile communication device access to a remote network at a higher priority level than a second mobile communication device for a duration of the event.

19. The method as in claim 1 further comprising:

prior to the event, providing a second mobile communication device higher priority access through the first wireless access point to a remote network than the first mobile communication device; and for a duration of the event, in accordance with the wireless access point control information, providing the first mobile communication device higher priority access through the first wireless access point to the remote network than the second mobile communication device.

20. The method as in claim 1, wherein determining the first wireless access point in the vicinity of the location of the event includes:

detecting that the location of the event resides within a first region of wireless coverage provided by the first wireless access point, the first wireless access point providing the first mobile communication device access to a remote network in accordance with the wireless access point control information.

21. The method as in claim 20 further comprising:

in response to detecting that the location of the event resides within a second region of wireless coverage provided by a second wireless access point, notifying the second wireless access point to provide the first mobile communication device access to the remote network in accordance with the wireless access point control information.

22. The method as in claim 1 further comprising:

detecting multiple wireless access points in the vicinity of the location of the event as specified by the location information, the detected multiple wireless access points including the first wireless access point and a second wireless access point; and notifying the second wireless access point to control flow of the first data between the second wireless access point and the first mobile communication device in accordance with the wireless access point control information.

23. The method as in claim 1 further comprising:

at the first wireless access point, receiving a request from the first mobile communication device to access a remote network through the first wireless access point; and in response to the first wireless access point detecting that the first mobile communication device is authorized to use the first wireless access point to access the remote network, providing the first mobile communication davice access through the first wireless access point to the remote network.

* * * * *